April 25, 1933.　　　　　F. COREY　　　　　1,905,267
DIRECTION INDICATING BEACON
Filed July 30, 1927
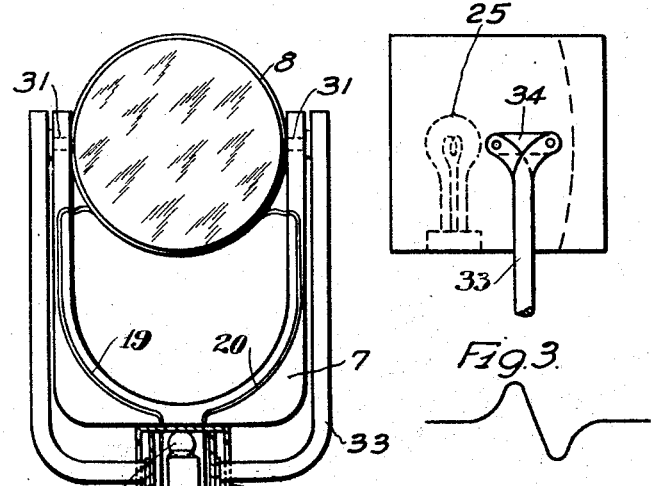
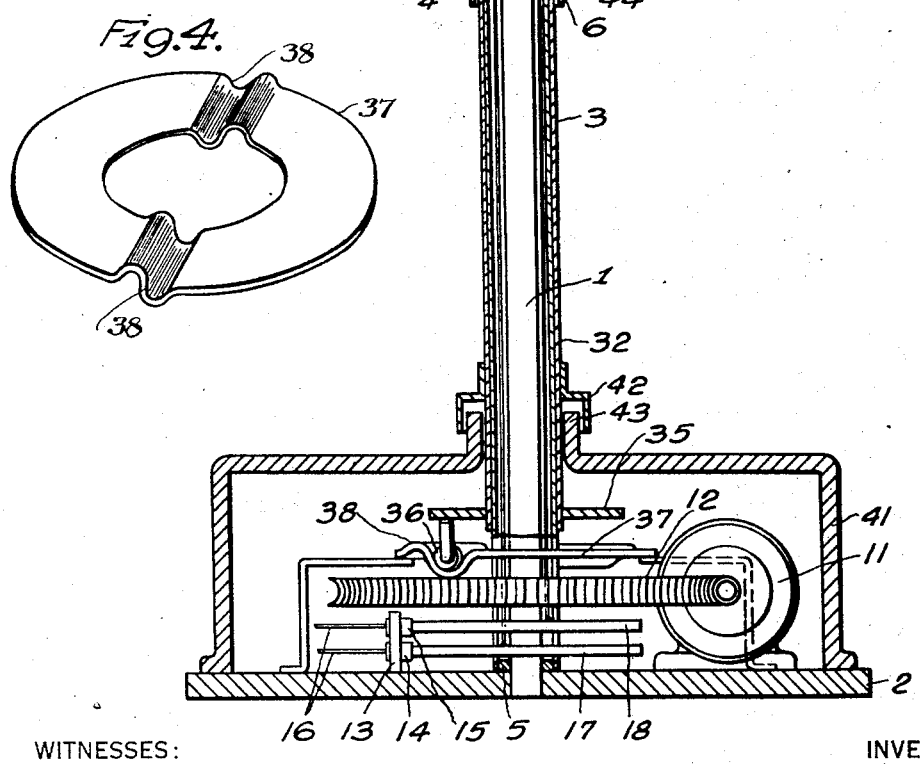
WITNESSES:
E. A. McCloskey
W. D. O'Connor
INVENTOR
Flournoy Corey.
BY Wesley G. Carr
ATTORNEY Patented Apr. 25, 1933

1,905,267

UNITED STATES PATENT OFFICE

FLOURNOY COREY, OF PITTSBURGH, PENNSYLVANIA, ASSIGNOR TO WESTINGHOUSE ELECTRIC & MANUFACTURING COMPANY, A CORPORATION OF PENNSYLVANIA

DIRECTION-INDICATING BEACON

Application filed July 30, 1927. Serial No. 209,448.

My invention relates to lighting fixtures and it has particular relation to a lighting device for indicating, for example, the proper direction of flight to aviators.

A part of present lighting equipment for use in aviation is the rotating beacon, the powerful beam of which sweeps the horizon and apprises the aviator of the location of the proper course of travel or the "air-way". These rotating beacons serve their purpose well, namely, that of locating the "air-way", when a number of them are visible to the aviator, but such a device is disadvantageous in that it fails to indicate to the aviator the direction of the aerial pathway when only one beacon is in sight.

Therefore, one of the objects of my invention is to provide a rotating beacon which will inform the aviator whether or not he is upon the proper course, even though only one light is visible.

Another object of my invention is to provide a device in which a single beacon serves the purpose of locating the "air-way" and also indicating its direction.

Another object of my invention is to provide a rotating beacon which will indicate corners in the course or changes in direction of the "air-way".

Another object of my invention is to provide a device in which provision is made for protection of the mechanism from the weather.

A further object of my inventon is to provide a device of the above-indicated character which shall be simple and rugged in construction and economical to manufacture and maintain.

My device may comprise a rotating beacon of the usual type except that provision is made for moving the projector independently of its circular path of travel, as governed by the usual motor and helical gear. This auxiliary motion is controlled by means of a cam-and-follower device. The projector may be made to move in any direction, by means of the cam-and-follower mechanism.

This auxiliary motion of the projector takes place when the projected beam is in the direction of the "air-way", and the aviator is informed of the direction of the aerial path-way by reason of the "flicker" in the beam.

My device may be better understood by reference to the accompanying drawing, in which like figures indicate like parts:

Figure 1 is a view, partly in elevation and partly in section, of my device, the lower portion of the standard 2 being shown in elevation in order to better show the helical-gear drive and commutator mechanism, Fig. 2 is a view, in side elevation, of the projector housing, Fig. 3 shows diagrammatically the path of the projected beam when a cam system according to this invention is employed, and Fig. 4 is a view, in perspective, of the cam-and-follower mechanism.

Referring to Fig. 1, a post or shaft 1 is rigidly mounted on a base 2 which, in turn, may be anchored to any suitable foundation. The shaft 1 provides a spindle on which may be mounted a sleeve 3, which is supported by means of ball bearing 4 and a bushing 5 to permit rotation. The upper portion of the shaft 3 is provided with an inverted cup-shaped member or cap 6, which projects the inner portion of the bearing mechanism and also provides a base for supporting a yoke member 7 on which a projector housing 8 is pivotally mounted. The projector housing is preferably pivoted at its center of gravity.

The sleeve 3, carrying projector housing 8, is rotated at a uniform speed of about ten revolutions a minute by means of a motor 11 which is fastened to the base 2 and drives a helical gear 12 which, in turn, is rigidly fastened to the sleeve 3. A standard 13, carrying brushes 14 and 15, is mounted on the base 2, and suitable conductors 16 are attached to the brushes. The brushes make contact with slip rings 17 and 18 which are rigidly fastened to the shaft 3. Conductors 19 and 20 are electrically connected to the slip rings and pass between shaft 1 and the sleeve 3 up through the cap 6, through the yoke member 7 and out to the projector housing 8, where they are connected to the lamp 25.

If desired, provision may be made for leading the conductors up to the pivots 31 and insulating the pivots from the projector housing and from the yoke member 7, so that electrical connection may be made with the lamp through the insulated pivots.

A second, or vertical-motion sleeve 32 is slidably mounted on the sleeve 3 so that it may move longitudinally with respect thereto. A second yoke member 33 is pivotally attached to the upper end of the sleeve 32. The upper end of the yoke member 33 is pivotally attached to a lever arm 34, which is fastened on the pivots of the projector housing so that up-and-down motion of the sleeve 32 causes the projector housing 8 to be moved vertically through an arc of 15 or 20°. If desired, the motion may be made more positive by placing a coil spring between the cap 6 and yoke 33 inside the cap. Any desired arc of movement may be obtained, as hereinafter explained.

A follower plate 35, carrying follower roller 36, is rigidly attached to the lower portion of the sleeve 32.

A circular cam surface 37 of such character is provided that the follower roller 36 which engages the cam surface is caused to move up and down at predetermined points by means of the S-shaped wave 38 in the cam surface. There may be two or more of these waves in the cam surface. If the "airway" comprises a straight course, the waves are disposed at 180° from each other, as shown in Fig. 6, but, if the beacon is at a corner or change in the course, the waves in the cam surface may be disposed at less than 180°, in accordance with the direction of the "air-way".

Any desired action of the projector housing may be secured by properly designing the cam surface. In the modification shown, if the projector is rotated from the right to the left in a clockwise direction, when viewed from above, the projector will be caused to dip below its ordinary circle of travel so that the projected beam will strike the ground, then move upwardly, by reason of the second part of the wave in the cam surface, so that the projected beam will be above the normal horizontal position. On further revolution of the shaft 3, the roller 36 strikes the flat surface of the cam, and the projector resumes such normal position that the projected beam follows a path about 1½° above the horizon. The motion of the beam, in this case, is shown diagrammatically in Fig. 3. The up-and-down motion of the projector housing causes a very perceptible flicker of the projected beam in the direction of the "air-way".

The motor, gear mechanism, cam and follower, and electrical connections are protected from the weather by means of a housing 41 fastened to the base 2, which is adapted to cover these members. A sleeve 42 is fastened to the vertical-motion sleeve 32 and extends over the flange 43 of the housing to form a weather-proof joint therewith. The cup-shaped member 6 covers the upper end of the shaft 1, sleeves 3 and 32 and bearing 4, except for slots 44 which permit vertical motion of the arm 33.

The term "projector" is to be taken as meaning any mirror or system of lenses for throwing an image, and, in fact, any device for projecting or reflecting a beam of light. When using a source of illumination and a reflector, I may move the lamp or source of illumination or the reflector or both. Moreover, I may provide a system of lenses and move the lenses or the lamp or both.

In the modification shown, the follower is a part of the vertically moving portion, and the cam surface is stationary, but the position of the two may be reversed. The arrangement shown provides for vertical movement of the follower, but the cam surface may be made vertical to produce a horizontal motion of the follower.

It is further contemplated that any desired motion of the projector and, thus, the projected beam, may be made by alteration of the cam shape. These and other modifications which may suggest themselves to those skilled in the art may be made without departing from the spirit and scope of my invention as defined in the appended claims.

I claim as my invention:

1. In a direction-indicating beacon, a base, a plurality of tubes rotatably mounted on the base, a projector pivotally mounted at the upper end of one of the tubes, the second tube being adapted to slide longitudinally with relation to the first named tube and being operatively connected to the projector, and means comprising a follower secured to the second named tube and a cam surface mounted within the base to cause the projector to execute an intermittent movement independently of its rotary movement.

2. In a direction-indicating beacon, a base, a cam surface thereon, a projector thereabove, a plurality of coaxial interfitting tubes, one of which is supported by the base and supports the projector, the lower end of the second tube having a follower engaging the cam surface and upper end thereof operatively engaging the projector at points spaced from those at which the first tube engages the projector.

3. In a direction-indicating beacon, a base, one of the members of a cam and follower mechanism mounted thereon, a projector thereabove, a plurality of interfitting tubes rotatably mounted with relation to the base, one of said tubes being provided at its upper end with pivot members adapted to pivotally support the projector and being further provided with driving means at its lower extremity to rotate the projector about a vertical axis and a second tube having the other member of the aforesaid cam and follower mechanism secured to its lower end and its upper end operatively connected to the projector whereby the second tube is caused to move with relation to the first named tube to cause the projector to be moved relative to its supporting tube at certain points in the path of rotation.

In testimony whereof, I have hereunto subscribed my name this 23rd day of July 1927.

FLOURNOY COREY.